US006540526B2

(12) United States Patent
Toda

(10) Patent No.: US 6,540,526 B2
(45) Date of Patent: Apr. 1, 2003

(54) ELECTRICAL CONNECTOR

(75) Inventor: Shinsaku Toda, Kanagawa (JP)

(73) Assignee: Tyco Electronics, AMP, K.K., Kanagawa (JP)

( * ) Notice: Subject to any disclaimer, the term of this patent is extended or adjusted under 35 U.S.C. 154(b) by 0 days.

(21) Appl. No.: 10/023,926

(22) Filed: Dec. 18, 2001

(65) Prior Publication Data

US 2002/0081870 A1 Jun. 27, 2002

(30) Foreign Application Priority Data

Dec. 22, 2000 (JP) ....................................... 2000-389907

(51) Int. Cl.[7] ................................................ A01R 12/00
(52) U.S. Cl. ............................ 439/66; 439/862; 439/83
(58) Field of Search ............................. 439/66, 71, 74, 439/591, 862, 79, 80, 81, 82, 83

(56) References Cited

U.S. PATENT DOCUMENTS 3,873,173 A * 3/1975 Anhalt ........................ 439/66
4,664,458 A * 5/1987 Worth .......................... 439/66
5,139,427 A * 8/1992 Boyd et al. .................... 439/66
5,152,694 A * 10/1992 Bargain ....................... 439/66
5,865,643 A 2/1999 Suzuki ....................... 439/500
6,113,440 A * 9/2000 Fijten et al. ................ 439/862
6,315,621 B1 11/2001 Natori et al. ............... 439/862

FOREIGN PATENT DOCUMENTS

JP 10340750 A 12/1998 ........... H01R/13/42
JP 10 340750 12/1998 ........... H01R/13/42

* cited by examiner

*Primary Examiner*—P. Austin Bradley
*Assistant Examiner*—Briggitte R Hammond
(74) *Attorney, Agent, or Firm*—Barley, Snyder, Senft & Cohen, LLC

(57) ABSTRACT

An electrical connector with a plurality of contacts is provided wherein it offers improved contact reliability of a contact arm portion with a circuit board and allows for a longer arm length of the contact arm portion for a length along a horizontal direction of the housing. First and second resilient contact arms 12A, 12B extending in parallel to each other substantially obliquely from a first end of a base toward and above a second end of the base 11. Contact portions 13*c*, 14*c* at respective free ends of the contact arms, the contact portions are configured to insure that an electrical connection is made and maintained with a circuit board mounted thereon. The positions of the fixed end of the first and second resilient contact arms 12A, 12B are offset in horizontal and vertical directions to allow the contacts to have the resiliency required while minimizing the dimensions of the housing.

17 Claims, 3 Drawing Sheets

ELECTRICAL CONNECTOR

FIELD OF THE INVENTION

The present invention relates to an electrical connector comprising a plate-like base, a resilient contact arm extending from the base and having a contact portion in contact with a circuit board at its free end, and a plurality of contacts each having a connection portion extending from the base and connected to a separate circuit board from said circuit board.

DESCRIPTION OF THE RELATED ART

A conventional electrical connector according to the prior art is shown in FIGS. 5(A) and 5(B). This electrical connector 101 has a plurality of contacts 110 and an insulative housing 120 that accommodates these contacts 110.

Each of the stamped contacts 110 has a plate-like base 111. A resilient contact arm 112 extends from the base 111 on the right side in a horizontal direction (the right side in FIG. 5 (B)). A contact portion 113 is provided on the contact arm 112, the contact portion makes contact with a circuit board (not shown) at its free end. A connection portion 114 extends from the base 111 on the left side and is soldered to a second circuit board (not shown). A contact press-fit portion 115 extends upward at an upper end of the base 111 between the resilient contact arm 112 and the connection portion 114.

A plurality of contact accommodating passageways 121 in which the contacts 110 are accommodated are provided in the housing 120 in parallel to each other at a predetermined pitch in a transverse direction (a vertical direction in FIG. 5 (A)). Each contact accommodating passageway 121 is open at the lower side and has an upper wall which extends across most of the upper side. A press-fit opening 122 into which the contact press-fit portion 115 is press-fitted and a slit 123 from which the contact portion 113 projects are provided in this upper wall. The press-fit opening 122 and the slit 123 are alternately provided in the transverse direction of the housing 120, as shown in FIG. 5(A).

When the contact press-fit portion 115 of each contact 110 is fully inserted and press-fit into the press-fit opening 122 of the housing 120, the contact portion 113 passes through the slit 123. The plurality of contacts 110 are thereby secured to the housing 120 to complete an electrical connector 101. The connection portion 114 of this completed electrical connector 101 is soldered on the second circuit board to mount the electrical connector 101 on the second circuit board. The first circuit board is positioned on the connector so that circuit paths of the circuit board make contact with the contact portions 113 of the electrical connector 101. The first circuit board is maintained in position relative to the second circuit board by a fixing means such as screws. The two circuit boards are electrically connected to each other by means of the connector 101.

However, when the first circuit board engages the contact portions 113, each contact portion 113 makes contact with a respective circuit path of the circuit board. As the electrical engagement is made at a single point, the contact reliability of each resilient contact arm 112 with a respective circuit path of the circuit board is low. Thus, if the first circuit board is warped, the contact portion 113 and circuit path may not be placed in electrical engagement even when the two circuit boards are fastened to each other by a fixing means such as screws.

Also, since the contact press-fit portion 115 extends upward at an upper end of the base 111 of the contact 110 between the resilient contact arm 112 and the connection portion 114, an arm length of the resilient contact arm 112 is limited. Thus, a resilient region of the resilient contact arm 112 is small and consequently the resilient contact arm 112 may be plastically deformed even if a displacement of the contact portion 113 is small.

SUMMARY OF THE INVENTION

The present invention is made in view of the above problems, and an object is to provide an electrical connector which has a plurality of contacts having improved contact reliability of a contact arm portion with a circuit board.

Another object of the present invention is to provide an electrical connector which has a plurality of contacts having an increased arm length of a contact arm portion a horizontal direction of the housing.

The electrical connector has a plate-like base. A contact arm portion extends from the base and has a contact portion in contact with a first circuit board at its free end. A plurality of contacts, each having a connection portion, extend from the base and connect to a second separate circuit board. Each contact is formed by stamping a metal plate. An insulative housing accommodates the contacts and has in its upper wall a slit from which the contact portion projects. The contact arm portion is composed of first and second resilient contact arms having the contact portion at their respective free ends and extending in parallel to each other substantially obliquely in a horizontal direction of the base. The starting positions of said first and second resilient contact arms are spaced in horizontal and vertical directions.

The resilient contact arm has first and second resilient contact arms with the contact portion positioned at their respective free ends. The contact portions extend in parallel to each other substantially obliquely in a horizontal direction of the base so that the circuit board makes contact with the contact portions of the first and second resilient contact arms. The first and second resilient contact arms are flexible independently from the electrical connector, thereby offering improved contact reliability of the resilient contact arms with the circuit board.

The first and second resilient contact arms extend in parallel to each other substantially obliquely from one end toward the other end in a horizontal direction of the base. The positions of the starting points or unstressed positions of the first and second resilient contact arms are shifted or spaced in horizontal and vertical directions, thereby allowing for an increased arm length of the two resilient contact arms along a horizontal direction of the housing.

If a horizontal length of the housing is fixed while the positions of the starting points of the first and second resilient contact arms are spaced only in a horizontal direction, then the distance between the two resilient contact arms is not sufficient to allow for clearance between the two resilient contact arms during stamping of a metal plate. Thus, by spacing the positions of the starting points of the first and second resilient contact arms not only in a horizontal direction but also in a vertical direction, a sufficient clearance is provided between the two resilient contact arms during stamping of a metal plate.

The position of the starting point of the first resilient contact arm is downwardly offset with respect to the position of the starting point of said second resilient contact arm positioned. A vertical length of the contact portion of the first resilient contact arm is longer than a vertical length of the contact portion of the second resilient contact arm.

This electrical connector ensures that the contact portions of the first and second resilient contact arms make contact with the circuit board without making a horizontal dimension of the housing excessive.

The housing has on an upper portion of its side wall, a second slit communicating with the slit formed in said upper wall. The contact portion of the first resilient contact arm enters the second slit when the first resilient contact arm is flexed downward.

When the first resilient contact arm having the vertically long contact portion is flexed downward, the contact portion enters the second slit, avoiding any collision of the contact portion of the first resilient contact arm with the side wall of the housing, thereby allowing a horizontal dimension of the housing to be utilized effectively. Also, when the first resilient contact arm is flexed downward, the contact portion is guided by the second slit, avoiding any damage to the first resilient contact arm due to the disengagement of the contact portion from the second slit.

DETAILED DESCRIPTION OF THE INVENTION

Figure 1:
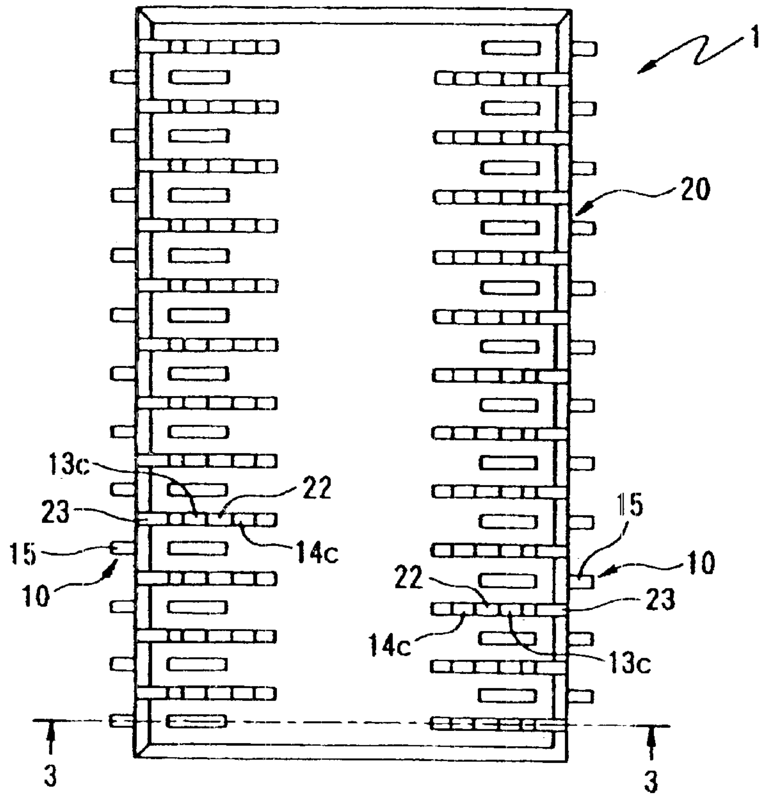
FIG. 1 is a plane view of an embodiment of an electrical connector according to the present invention.
Figure 2:
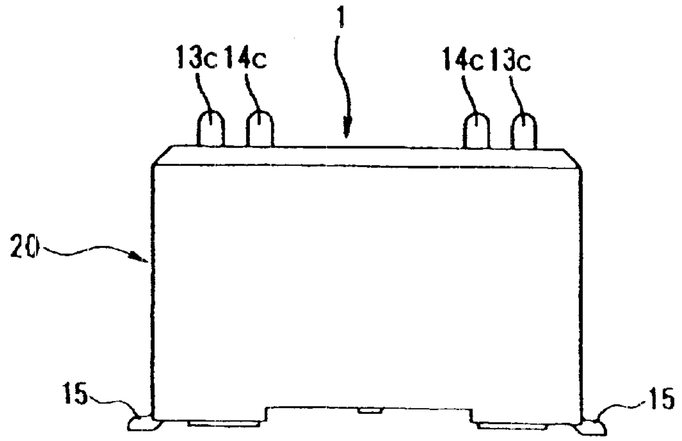
FIG. 2 is a front view of the electrical connector as shown in FIG. 1.
Figure 3:
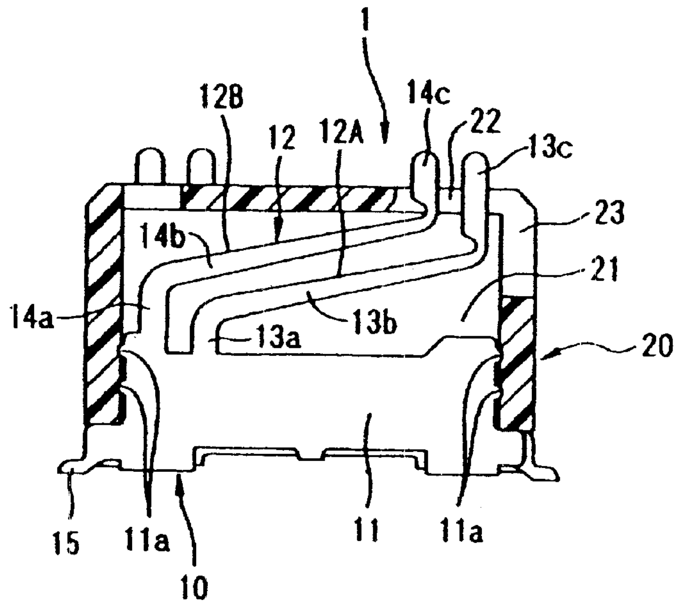
FIG. 3 is a cross-sectional view taken along line 3—3 in FIG. 1.
Figure 4:
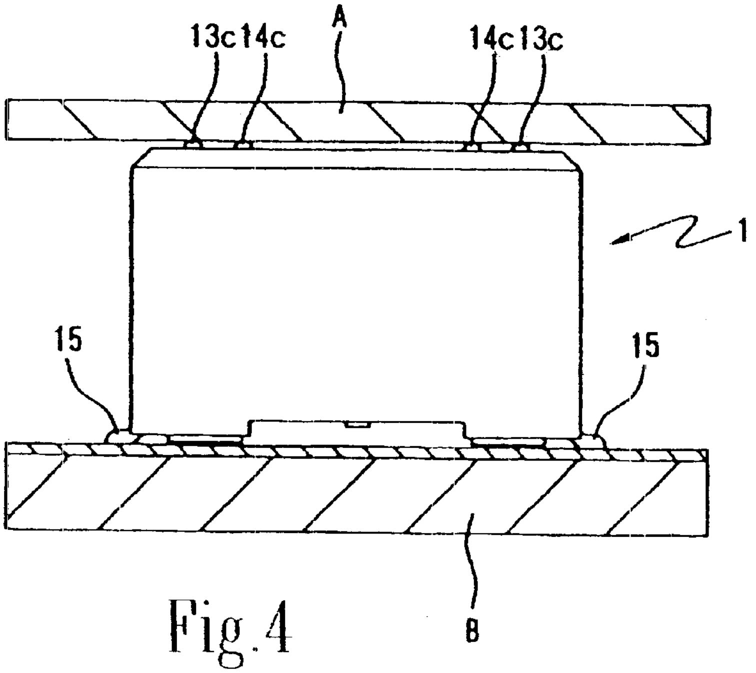
FIG. 4 is a front view of a circuit board and a separate circuit board interconnected by the electrical connector as shown in FIG. 1.

Embodiments of the present invention will now be described with reference to the drawings. FIG. 1 is a plane view of an embodiment of the electrical connector according to the present invention. FIG. 2 is a front view of the electrical connector as shown in FIG. 1. FIG. 3 is a cross-sectional view taken along line 3—3 in FIG. 1. FIG. 4 is a front view of a circuit board and a separate circuit board interconnected by the electrical connector as shown in FIG. 1.

In FIGS. 1 to 4, an electrical connector 1 has a plurality of contacts 10 and an insulative housing 20 that accommodates these contacts 10 in a staggered arrangement.

Each of the contacts 10 is stamped and formed from a sheet metal plate. Each contact has a plate-like rectangular base 11, a contact arm portion 12 extending from an upper edge of the base 11, and a connection portion 15 extending from one edge in a horizontal direction of the base 11 (the left edge in FIG. 3).

The base 11 is a rectangular plate having a horizontal length substantially equal to the horizontal length of a contact housing passageway 21. A plurality of engagement projections 11*a* are positioned on the base to engage respective side walls of the housing 20. The projections project at opposite edges in a horizontal direction of the base 11.

The contact arm portion 12 is composed of first and second resilient contact arms 12A, 12B extending essentially parallel to each other substantially obliquely from one end toward the other end which is spaced from the base 11 in the horizontal direction. The initial positions of the first and second resilient contact arms 12A, 12B are spaced from each other in horizontal and vertical directions. The first resilient contact arm 12A is positioned on the right side in FIG. 3 and the second resilient contact arm 12B is positioned on the left side in FIG. 3.

The configuration of each of the first and second resilient contact arms 12A, 12B is specifically described. The first resilient contact arm 12A has a first extension portion 13*a* which extends from an upper edge of the base 11 in a horizontal direction. The extension portion extends from proximate an end of base 11. A second extension portion 13*b* extends substantially obliquely from the tip of the first extension portion 13*a*. The second extension portion 13*b* is tapered such that the portion 13*b* is wider proximate portion 13*a*. A contact portion 13*c* extends upward from the tip of the second extension portion 13*b* away from base 11. The contact portion 13*c* is wider than the second extension portion 13*b*.

The second resilient contact arm 12B has a first extension portion 14*a* which extends from the upper edge of the base 11. A second extension portion 14*b* extends substantially obliquely from the tip of the first extension portion 14*a*. The second extension portion 14*b* is tapered such that the portion 14*b* is wider proximate portion 14*b*. A contact portion 14*c* extends upward from the tip of the second extension portion 14*b* away from base 11. The contact portion 14*c* is wider than the second extension portion 14*b*. The first extension portions 13*a*, 14*a*, the mil 5 second extension portions 13*b*, 14*b* and contact portion 13*c*, 14*c* extend in parallel to each other with their center lines spaced at a predetermined interval.

The vertical length of the contact portion 13*c* of the first resilient contact arm 12A is longer than the vertical length of the contact portion 14*c* of the second resilient contact arm 12B, thereby spacing the tips of the contact portions 13*c*, 14*c*, when in a free state, an equal distance from the base 11 in the vertical direction. Upper ends of these contact portions 13*c*, 14*c* make contact with the bottom face of a first circuit board A mounted above the electrical connector 1 as shown FIG. 4.

A connection portion 15 extends from an edge in a horizontal direction of the base 11 in a horizontal direction. The connection portion 15 is soldered on a separate or second circuit board B from the circuit board A as shown FIG. 4.

A plurality of contact accommodating passageways 21 in which the contacts 10 are accommodated are provided in the housing 20 in parallel to each other at a pre-determined pitch in the transverse direction (a vertical direction in FIG. 1). Each contact accommodating passageway 21 is open at the lower side as shown in FIG. 3 while the upper side is closed by its upper wall and the opposite sides in a horizontal direction are closed by its side wall. A first slit 22 from which the contact portions 13*c*, 14*c* of the first and second resilient contact arms 12A, 12B project is provided in the upper wall of the housing 20. The first slit 22 is provided in a staggered arrangement in the transverse direction of the housing 20 as shown in FIG. 1.

The housing 20 has on an upper portion of its side wall a second slit 23 communicating with the first slit 22 formed in the upper wall. The contact portion 13*c* of the first resilient contact arm 12A enters the second slit 23 when the first resilient contact arm 12A is flexed downward.

To assemble the electrical connector 1, the base 1 1 of each contact 10 is press-fit into the contact accommodating passageways 21 of the housing 20 in sequence so that the contact portions 13*c*, 14*c* project from the first slit 22. Thus, the plurality of contacts 10 are secured to the housing 20 to complete the electrical connector 1.

Referring to FIG. 4, when the connection portion 15 of the contact 10 is soldered on circuit board B, the electrical connector 1 is mounted on the circuit board B. In this state, the circuit board A is brought into engagement with the contact portions 13*c*, 14*c* of the first and second resilient contact arms 12A, 12B from above the electrical connector 1. Circuit board A is fixed to the connector and to circuit board B by a fixing means such as screws or other known devices. By so doing, the circuit boards are positioned and maintained in electrical engagement with each other.

As the circuit board A is moved into engagement with the contact portions 13*c*, 14*c* of the first and second resilient contact arms 12A, 12B, the first and second resilient contact arms 12A, 12B are flexed downward, causing the contact arms to rotate substantially about their fixed ends. As this occurs, the contact portion 13*c* of the first resilient contact arms 12A enters the second slit 23 formed on the upper portion of the side wall of the housing 20. This avoids any collision of the contact portion 13*c* of the first resilient contact arm 12A with the side wall of the housing 20, allowing the horizontal dimension of the housing 20 to be utilized effectively by minimizing the dimension required. As the first resilient contact arm 12A is flexed downward, the contact portion 13*c* is guided by the second slit 23, thereby properly locating each contact portion 13*c* and avoiding any damage to the first resilient contact arm 12A due to the disengagement of the contact portion 13*c* from the second slit 23.

As the circuit board A is mated to connector 1, portions of the board are placed in electrical engagement with the contact portions 13*c*, 14*c* of the first and second resilient contact arms 12A, 12B. As the contact portions 13*c*, 14*c* are flexible independently from each other and from the housing of the electrical connector 1, improved contact reliability between the contact arm portion 12 and the circuit board A is provided as compared to contact with a conventional single arm. Consequently, as two contact portions 13*c*, 14*c* are provided on contact arm 12, and as the contact portions 13*c*, 14*c* can move independently of each other, a positive electrical connection will be provided between the board A and contact arm portion 12 even if either board A, B is warped. It is worth noting that the distance that the contact portions 13*c*, 14*c* extend from the top face of the housing 20 may be increased to further insure that the contact portions 13*c*, 14*c* make positive electrical connection with the board even in adverse conditions.

Figure 5A:
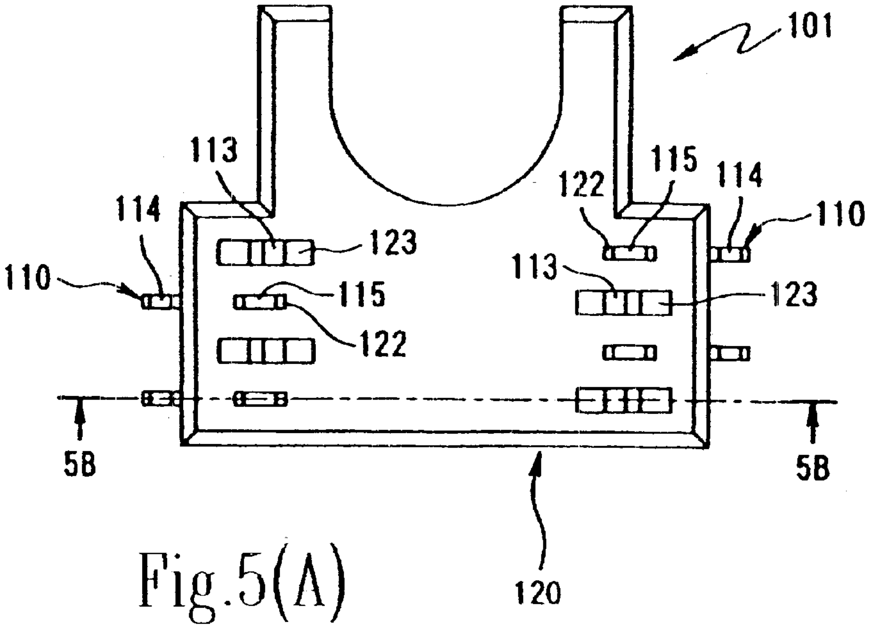
Fig.5(A) Prior Art
FIGS. 5 (A) and (B) show a conventional exemplary electrical connector of the prior art, (A) being a plane view and (B) being a cross-sectional view taken along line 5B—5B in (A).
Figure 5B:
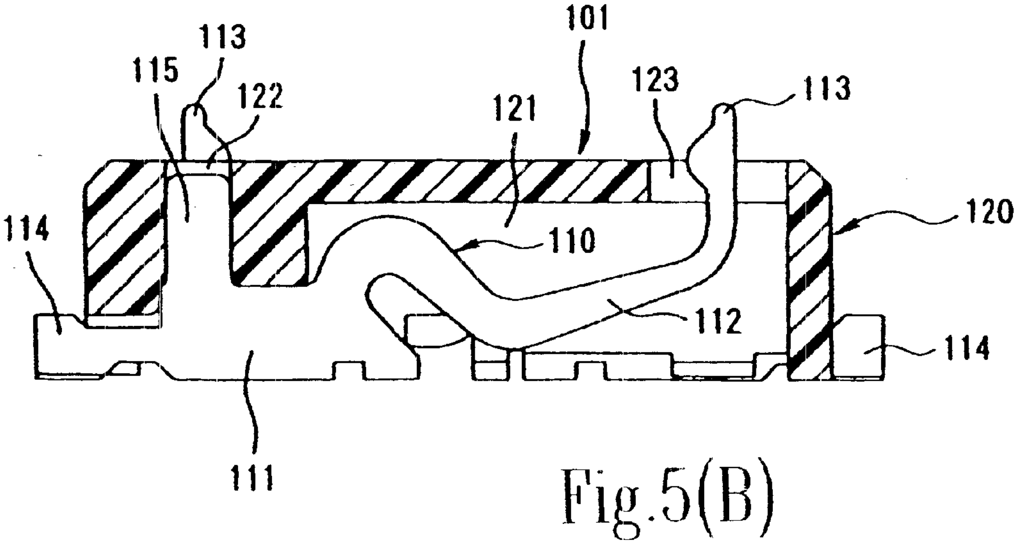
Fig.5(B) Prior Art

As shown in FIG. 3, the first and second resilient contact arms 12A, 12B extend in parallel to each other and extend obliquely from the fixed end toward and above the free end which is spaced from the base 11. The positions of the fixed ends of the first and second resilient contact arms 12A, 12B are shifted in both the horizontal and vertical directions. When compared to the prior art connector shown in FIG. 5B, the arm length of the resilient contact arms 12A, 12B of the present invention can be longer as compared to a conventional contact in which a press-fit portion is provided in the middle of a base. The increased length of the contact arms does not require an increase in the width of the housing.

If a horizontal length of the housing 20 is fixed while the positions of the starting points or fixed ends of the first and second resilient contact arms 12A, 12B are shifted only in a horizontal direction, then the distance between the two resilient contact arms 12A, 12B is lessened so that a sufficient clearance cannot be provided between the two resilient contact arms 12A, 12B during stamping of a metal plate. Thus, by shifting the positions of the starting points of the first and second resilient contact arms 12A, 12B not only in a horizontal direction but also in a vertical direction, a sufficient clearance can be provided between the two resilient contact arms 12A, 12B during stamping of a metal plate.

The position of the fixed end of the first resilient contact arm 12A is offset in the downward position when viewed in FIG. 3 with respect to the fixed end of the second resilient contact arm 12B. A vertical length of the contact portion 13*c* of the first resilient contact arm 12A is longer than a vertical length of the contact portion 14*c* of the second resilient contact arm 12B so that the tip positions of the contact portions 13*c*, 14*c* in a free or unstressed state are the same in the vertical direction. This ensures that the contact portions 13*c*, 14*c* of the first and second resilient contact arms 12A, 12B make contact with the circuit board A without making a horizontal dimension of the housing 20 excessive.

As the contacts 10 are formed only by stamping a metal plate, an attachment pitch in the transverse direction of the contact 10 (a vertical direction in FIG. 1) can be made small.

While the embodiment of the present invention has been described, the present invention is not limited to it and various changes can be made as necessary. For example, the position of the starting point or fixed end of the first resilient contact arm 12A may be varied with respect to the starting point or fixed end of the second resilient contact arm 12B.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An electrical connector comprising:

an insulating housing having a plurality of contacts and an upper wall with a first slit; and each contact having a first resilient contact arm that extends obliquely from a fixed end attached to a base to a free end having a contact portion that projects through the first slit to contact a first printed circuit board, a second resilient contact arm parallel to the first resilient contact arm that extends obliquely from a fixed end attached to the base to a free end having a contact portion that projects through the first slit to contact the first printed circuit board, and a connection portion that extends from the base to contact a second circuit board.

2. The electrical connector according to claim 1, wherein the fixed end of the first resilient contact arm is offset in the vertical direction with respect to the position of the fixed end of the second resilient contact arm.

3. The electrical connector according to claim 1, wherein the housing has a side wall having a second slit that communicating with the first slit formed in said upper wall, and the contact portion of the first resilient contact arm enters the second slit when the first resilient contact arm is flexed downward.

4. The electrical connector according to claim 1, wherein the base includes projections that engage the housing.

5. The electrical connector according to claim 1, wherein the contacts are stamped and formed from a sheet metal plate.

6. The electrical connector according to claim 1, wherein the first resilient contact arm is offset from the second resilient contact arm in a vertical and horizontal direction.

7. The electrical connector according to claim 1, wherein the first resilient contact arm moves independently from the second resilient contact arm to ensure an electrical connection between the contact portions of the respective resilient contact arms and the first circuit board when the first circuit board is warped.

8. The electrical connector according to claim 1, wherein a vertical length of the contact portion of the first resilient contact arm is longer than a vertical length of the contact portion of the second resilient contact arm.

9. The electrical connector according to claim 8, wherein the contact portion of the first resilient arm and the contact portion of the second resilient arm project the same distance through the first slit.

10. An electrical connector comprising:

an insulating housing having a plurality of contacts and an upper wall with a first slit; and each contact having a first resilient contact arm that has a fixed end attached to a base and a free end having a contact portion that projects through the first slit to contact a first printed circuit board, a second resilient contact arm offset from the first resilient contact arm in a vertical and horizontal direction that has a fixed end attached to the base and a free end having a contact portion that projects through the first slit to contact the first printed circuit board, and a connection portion that extends from the base to contact a second circuit board.

11. The electrical connector of claim 10, wherein the first and second resilient contact arms extend obliquely in respect to the base.

12. The electrical connector according to claim 10, wherein the base includes projections that engage the housing.

13. The electrical connector according to claim 10, wherein the housing includes a side wall having a second slit that communicates with the first slit and receives the contact portion of the first resilient contact arm when the first resilient contact arm is displaced.

14. The electrical connector according to claim 10, wherein the contacts are stamped and formed from a sheet metal plate.

15. The electrical connector according to claim 10, wherein the first resilient contact arm moves independently from the second resilient contact arm to ensure an electrical connection between the contact portions of the respective resilient contact arms and the first circuit board when the first circuit board is warped.

16. The electrical connector according to claim 10, wherein a vertical length of the contact portion of the first resilient contact arm is longer than a vertical length of the contact portion of the second resilient contact arm.

17. The electrical connector according to claim 16, wherein the contact portion of the first resilient arm and the contact portion of the second resilient arm project the same distance through the first slit.

* * * * *